United States Patent [19]

McKee

[11] Patent Number: 5,809,441
[45] Date of Patent: Sep. 15, 1998

[54] APPARATUS AND METHOD OF NEUTRAL START CONTROL OF A POWER TRANSMISSION

[75] Inventor: Kevin D. McKee, Naperville, Ill.

[73] Assignee: Case Corporation, Racine, Wis.

[21] Appl. No.: 545,022

[22] Filed: Oct. 19, 1995

[51] Int. Cl.[6] .................................................. B60K 41/08
[52] U.S. Cl. .............................. 701/51; 701/62; 701/67; 477/89; 477/125
[58] Field of Search ...................... 364/424.08, 424.091, 364/424.092, 424.096, 424.097; 74/333, 335; 477/78, 79, 89, 125; 192/3.63, 15, 17 C, 17 D

[56] References Cited

U.S. PATENT DOCUMENTS

| | | | |
|---|---|---|---|
| 2,848,988 | 9/1958 | Binder | 123/179 |
| 3,285,361 | 11/1966 | Baker | 180/82 |
| 3,444,968 | 5/1969 | Golan et al. | 192/4 |
| 3,574,288 | 4/1971 | Barth et al. | 477/99 |
| 3,689,775 | 9/1972 | Smith et al. | 477/99 |
| 4,051,915 | 10/1977 | Behrens | 74/473 R |
| 4,227,598 | 10/1980 | Luft | 192/4 A |
| 4,267,804 | 5/1981 | Rypka | 74/527 |
| 4,421,082 | 12/1983 | Katayose et al. | 123/333 |
| 4,425,620 | 1/1984 | Batcheller et al. | 364/424.091 |
| 4,487,303 | 12/1984 | Boueri et al. | 364/424.096 |
| 4,514,811 | 4/1985 | Daubenmier et al. | 364/424.087 |
| 4,610,179 | 9/1986 | Parker | 74/335 |
| 4,650,048 | 3/1987 | Gregerson et al. | 192/3.57 |
| 4,718,307 | 1/1988 | Yabe et al. | 477/115 |
| 4,916,983 | 4/1990 | Amrein et al. | 477/125 |
| 5,082,097 | 1/1992 | Goeckner et al. | 477/80 |
| 5,111,921 | 5/1992 | Marks et al. | 192/4 A |
| 5,251,733 | 10/1993 | Falck et al. | 477/79 |
| 5,261,456 | 11/1993 | Patton et al. | 192/87.13 |
| 5,475,561 | 12/1995 | Goeckner et al. | 361/189 |

FOREIGN PATENT DOCUMENTS 57-81628-A1  5/1982  Japan.
1671485-A1  8/1991  Russian Federation.

*Primary Examiner*—Tan Q. Nguyen
*Attorney, Agent, or Firm*—Foley & Lardner

[57] ABSTRACT

A control system for a work vehicle transmission includes a sensor for detecting the output speed of the vehicle engine and an operator-movable command device for placing the transmission in a neutral condition. The transmission includes a plurality of intermeshing gears, and clutches associated with certain of the gears for selectively placing the transmission in various gear ratios for driving the vehicle. The clutches are engaged and disengaged by fluid valving in response to energization of solenoid coils driven by valve driver circuits. The sensor, the command device and the driver circuits are coupled to a control circuit, preferably including a microprocessor, for controlling engagement and disengagement of the transmission clutches. Upon startup, the control circuit disables the driver circuits to place the transmission in a neutral condition despite the position of the command device. The control circuit maintains the driver circuits disabled until the vehicle engine is running, as indicated by the speed sensor, and a neutral command signal is received. The neutral start routine serves as a redundant system with an analog neutral start circuit that normally disables the vehicle starter unless a neutral transmission condition is commanded upon startup. The system thus provides a neutral start feature in the event the neutral start circuit fails or is defeated, such as by jump starting the vehicle engine.

21 Claims, 10 Drawing Sheets

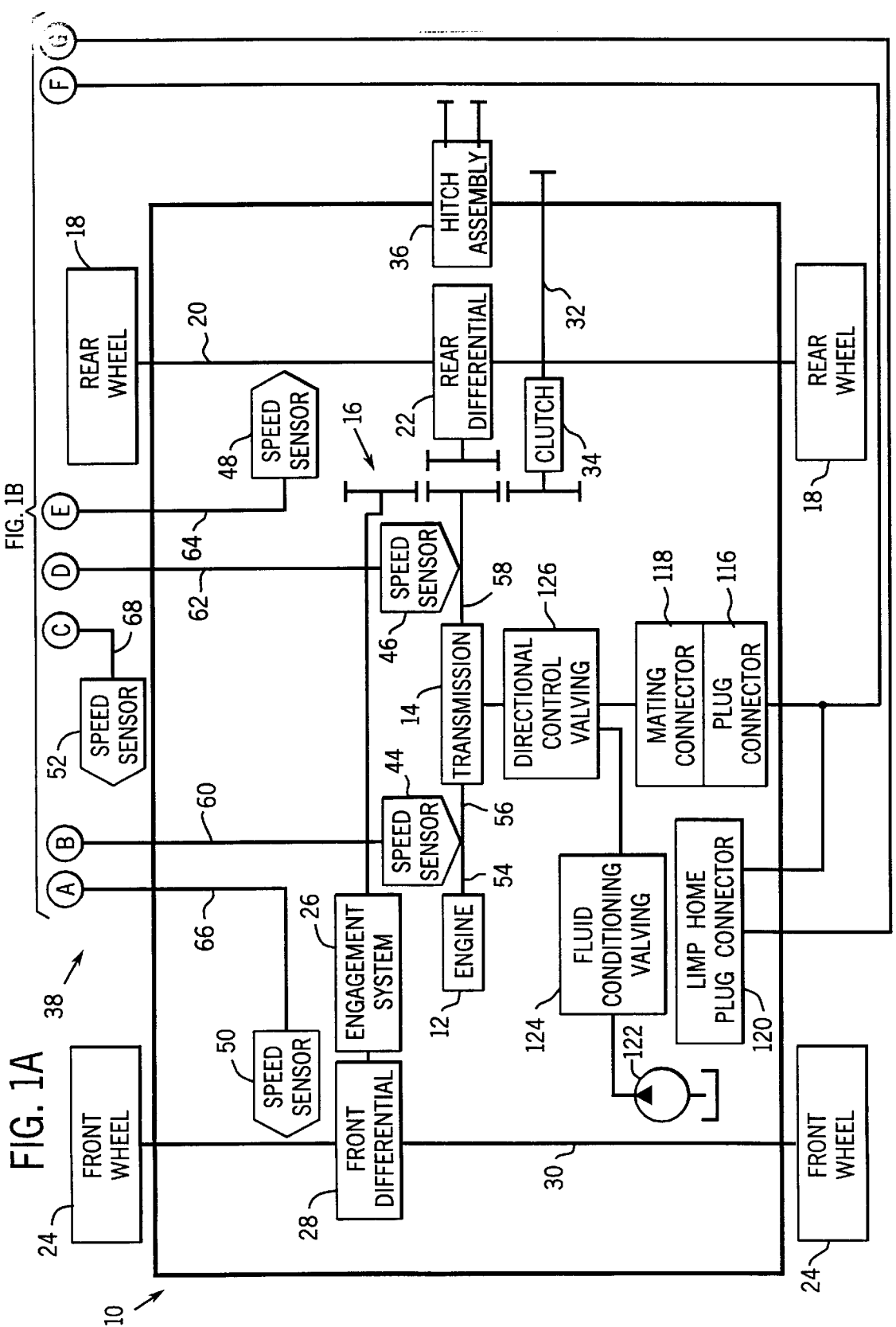

APPARATUS AND METHOD OF NEUTRAL START CONTROL OF A POWER TRANSMISSION

BACKGROUND OF THE INVENTION

The present invention relates generally to control of a power transmission in a work vehicle such as an agricultural tractor. More particularly, the invention relates to a technique for placing and maintaining the transmission in a neutral condition during startup of the vehicle engine, such as when the vehicle is jump started in such a way as to defeat neutral start circuitry.

In field of transmission systems for work vehicles, such as agricultural tractors, a number of transmission configurations and control schemes have been proposed and are presently in use. Such transmissions typically include a collection of intermeshing gears either fixed to transmission shafts or rotating freely on the shafts. Clutches associated with the freely rotating gears may be selectively engaged to establish a series of speed ratios between an engine output shaft and a transmission output shaft to transmit engine torque at a desired speed to driven wheels of the vehicle. Control systems for commanding engagement of the clutches typically include electronic circuitry that responds to operator controls, such as an upshift/downshift lever, a forward/reverse lever and the like in the vehicle cab. The control system sends electric signals to hydraulic valves that channel pressurized fluid to the clutches. Such control systems thus cause the clutches to engage and disengage in predetermined combinations to accelerate, decelerate and drive the vehicle as desired by the operator. A transmission and a control system of this type are described in U.S. Pat. No. 4,425,620, issued on Jan. 10, 1984 and assigned to Steiger Tractor, Inc.

Various circuit configurations and hardware devices have been proposed for transmission control systems of the type described above that prevent accidental starting of a vehicle, such as by jump starting, while the vehicle transmission is engaged in a forward or reverse gear. Such circuits typically either place the vehicle transmission in a neutral condition, or may actually lock up, or "four square" the transmission to prevent vehicle movement upon starting the engine. In one well known approach, a starter lockout or neutral start circuit disables the starter itself, thereby preventing starting of the vehicle, unless the transmission controls are placed in their neutral position. However, because an operator may bypass such neutral start circuitry by jump starting the vehicle with direct power connections to the starter, additional jump start disabling circuitry is often desirable to prevent vehicle movement upon startup.

In a similar technique, a neutral start circuit includes a neutral start relay circuit that electrically disables solenoid operated control valves that direct fluid to transmission clutches. The relay circuit is closed, thereby enabling the solenoid coils, only when a transmission shift lever is placed in a "neutral" or a "park" position. However, in the event of failure of the relay circuit in an closed position, coils controlling engagement of the transmission may become energized and thereby engage the transmission upon starting of the engine, particularly when the vehicle is jump started, bypassing starter lockout circuitry. Moreover, short circuits and similar electrical failures may cause energization of the solenoid coils, resulting in vehicle movement upon startup.

In yet another approach, a hydraulic dump valve is placed in series with directional control valves used to selectively engage and disengage the transmission clutches. The dump valve can be opened to dump pressurized fluid from the system and thereby prevent engagement of the clutches, and closed to permit pressurized engagement of the clutches. However, the presence of the dump valve and its associated plumbing increases the cost and complexity of the control system. Moreover, in the event of failure or sticking of the dump valve, residual pressure may be available to the directional control valves, potentially placing the transmission in gear during startup.

Therefore, despite the utility of known neutral start systems, there is a need for an improved transmission control system for work vehicles that effectively disables the transmission shifting elements when the vehicle is, particularly in a way, such as by jump starting, that defeats existing neutral start circuitry or in the event of failure of such circuitry. Moreover, there is a need for a redundant system including a digital control circuit for disabling transmission shifting valves during startup, thereby preventing engagement the transmission upon startup.

SUMMARY OF THE INVENTION

The invention relates to a novel control system and to a method for controlling a transmission designed to respond to these needs. The system is particularly suited for use on work vehicles, such as agricultural tractors and the like. By disabling solenoid coils associated with transmission engagement and disengagement control valves, the control system effectively disables and transmission, providing a redundant neutral start feature with analog neutral start circuitry of a type generally known in the art.

Thus, in accordance with a first aspect of the invention, a control system is provided for a vehicle transmission of the type including an input shaft coupled to a vehicle engine, an output shaft for driving the vehicle, a plurality of intermeshing gears, and a plurality of fluid clutches associated with the gears. The clutches being selectively engageable in predetermined combinations via fluid valving to establish desired gear ratios between the input shaft and the output shaft. The control system includes a sensor, an operator-movable command device, a clutch engagement circuit and a control circuit. The sensor generates an engine running signal representative of an engine running condition, while the command device generates an operator-induced neutral command signal. The clutch engagement circuit includes plurality of solenoid coils associated with the clutches and selectively energizable to engage the clutches. The clutch engagement circuit also includes a driver circuit coupled to the solenoid coils for selectively energizing the coils. The control circuit is coupled to the sensor, the command device and the clutch engagement circuit, and disables the solenoid coils upon startup of the vehicle engine until the engine running signal and the neutral command signal indicate the vehicle engine is running and a vehicle operator has commanded a neutral transmission state.

In accordance with another aspect of the invention, a control system for a transmission of the type described above includes a clutch engagement circuit, an analog electrical neutral start circuit and a digital control circuit. The clutch engagement circuit includes a plurality of solenoid coils associated with the clutches and selectively energizable to engage the clutches, and a driver circuit coupled to the solenoid coils for selectively energizing the coils in response to control signals. The analog electrical neutral start circuit places the transmission in a neutral condition upon startup of the engine. The digital control circuit is coupled to the clutch engagement circuit, and redundantly places the transmission in a neutral condition upon startup of the engine and until the engine is in a running condition and a neutral condition is commanded by an operator.

In accordance with a further aspect of the invention, a method is provided for controlling a transmission in a vehicle of the type including an engine, a transmission coupled between the engine and a drive train, and an operator-movable command device for placing the transmission in preselected forward, neutral and reverse drive conditions. In accordance with the method, a parameter representative of a running condition of the engine is sensed and an engine running signal is generated representative thereof. A position of the command device is sensed and a command signal is generated representative of the position. Driver circuits for shifting transmission control valves are disabled to place the transmission in a neutral condition, and the driver circuits are enabled to permit the transmission to be shifted to forward and reverse gear ratios and thereby to transmit power from the engine to the drive train when the engine running signal and the command signal indicate a neutral condition is commanded and the vehicle engine is running.

BRIEF DESCRIPTION OF THE DRAWINGS

The present invention will become more fully understood from the following detailed description, taken in conjunction with the accompanying drawings, wherein like reference numerals refer to like parts, in which:

FIGS. 1A and 1B are a diagrammatical view of a work vehicle incorporating an exemplary transmission control system;

DESCRIPTION OF THE PREFERRED EMBODIMENTS

Figure 1B:
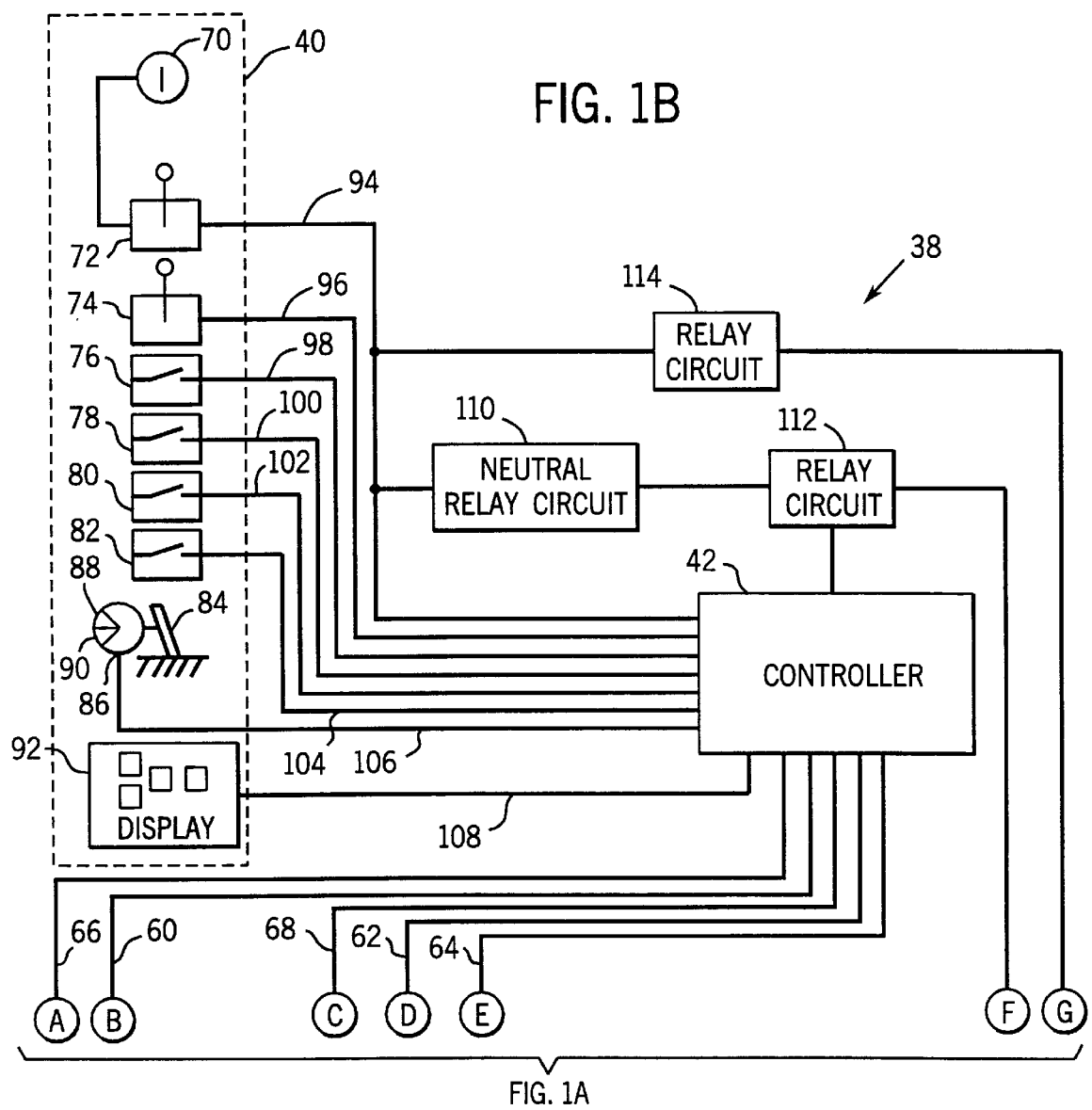

Turning now to the drawings and referring to FIGS. 1A and 1B, a vehicle, such as an agricultural tractor, designated by the reference numeral 10, includes an engine 12 mechanically coupled to a transmission 14. Transmission 14 selectively drives gearing, designated generally by the reference numeral 16, at various gear ratios as commanded by an operator and controlled by a controller as described below. Gearing 16 drives rear wheels 18 mounted on a rear axle 20 through a rear differential 22. Gearing 16 preferably also permits transmission 14 to drive front wheels 24 through a front wheel drive engagement system 26, front differential 28 and front axle 30. Gearing 16, differentials 22 and 28 and front wheel drive engagement system 26 may be of generally known construction. Gearing 16 is also coupled to a power take off shaft 32 through a power take off clutch 34 for driving various implements (not shown) which may be coupled to vehicle 10, such as on a hitch assembly 36.

The operation of transmission 14 is controlled by a control system, indicated generally by the reference numeral 38. Control system 38 includes operator command devices in an operator station 40, typically located in a covered vehicle cab (not shown). Control system 38 also includes a transmission controller 42 coupled to operator station 40 and to instrumentation and control circuitry as described below.

As schematically illustrated in FIGS. 1A and 1B, instrumentation for control system 38 preferably includes speed sensors 44, 46, 48, 50 and a ground speed sensor 52. Speed sensor 44 is associated with an engine output shaft 54 linking engine 12 to transmission 14, or with a transmission input shaft 56 coupled to shaft 54. Speed sensor 46 is associated with a transmission output shaft 58. Speed sensors 44 and 46 may be of any suitable type, such as a magnetic proximity sensor associated with a toothed timing gear (not shown), as are well known in the art. Sensors 44 and 46 produce electrical signals representative of the rotational speed of shafts 54 (or 56) and 58, respectively, and apply these speed signals to transmission controller 42 through data communication lines 60 and 62, respectively. Speed sensors 48 and 50, which may be substantially identical to speed sensors 44 and 46, are associated with rear axle 20 and front axle 30, respectively. Sensors 48 and 50 produce electrical signals representative of the rotational speed of axles 20 and 30, and apply these signals to transmission controller 42 via communication lines 64 and 66, respectively. Ground speed sensor 52 preferably includes a radar emitter and receiver unit of generally known construction and is secured on vehicle 10, directed generally downwardly. Ground speed sensor 52 produces an electrical signal representative of the vehicle ground speed and applies this signal to transmission controller 42 via a communication line 68.

The signals produced by sensors 44, 46, 48, 50 and 52 are used as control inputs by controller 42 as described below. It should be noted that in appropriate situations, control system 10 may include more or fewer speed sensors, such as where the signals produced by one or more of sensors 44, 46, 48, 50 and 52 are redundant, or where a signal representative of the parameter sensed by a particular sensor is available from an alternative source. For example, ground speed sensor 52 provides an indication of the ground speed of vehicle 10. However, where front axle 30 is not positively driven by engine 12, the output of speed sensor 50 may be used for this purpose, or speed sensor 50 may be eliminated from the system and only ground speed sensor 52 used for the ground speed-related signal.

In the preferred embodiment illustrated, operator station 40 includes a key switch 70, a forward-neutral-reverse-park (FNRP) selection lever 72, a gear ratio increment and decrement, or "bump" lever 74, an automatic/manual selection switch 76, a diagnostic request switch 78 and a creeper switch 80. System 38 may include switches for additional operator commanded inputs, as indicated by the reference numeral 82. The interconnections between these components and transmission controller 42 are described in greater detail below. Generally however, key switch 70 permits an operator to selectively enable and completely disable the operation of vehicle 10 and transmission 14. FNRP lever 72 may be placed in four stable positions, including "forward," "reverse," "neutral" and "park," and permits an operator to selectively command controller 42 to shift transmission 14 into various forward, reverse and neutral gear ratios for driving vehicle 10 in a desired direction of travel and at desired speeds, as well as to lock transmission 14 in a "parked" configuration discussed below. Bump lever 74 allows the operator to increment or decrement the selected gear ratio and to preselect forward and reverse gear ratios to which transmission 14 will be shifted. Selection switch 76 permits the operator to override certain automatic control functions of controller 42 described below. Creeper switch 80 allows the operator to selectively engage an extremely low range of gear ratios where corresponding creeper gearing and a creeper clutch are provided in transmission 14.

Operator station 40 also includes a clutch pedal 84 coupled to a position sensor 86, and top-of-clutch and bottom-of-clutch switches 88 and 90, respectively. Movement of clutch pedal 84, as sensed by position sensor 86 and switches 88 and 90, permits a vehicle operator to regulate certain control functions of controller 42 as described below. Position sensor 86 may be of any suitable type, such as a rotary or linear potentiometer, which generates a signal representative of the position of clutch pedal 84. Top-of-clutch switch 88 and bottom-of-clutch switch 90 are two-position switches that provide signals to controller 42 indicating when clutch pedal 84 is in its fully raised and fully depressed positions, respectively. In addition, operator station 40 includes a visual display 92 for providing an operator with information relating to the state of transmission 14 (e.g. direction and level of selected gears, diagnostic codes, and the like).

Levers 72 and 74, and switches 76, 78, 80 and 82 are linked to transmission controller 42 via communication lines 94, 96, 98, 100, 102 and 104, respectively, and apply operator-induced command signals to controller 42 through their respective communication lines. Sensor 86, and top and bottom of clutch switches 88 and 90 are similarly linked to controller 42 via one or more communication lines 106. Display 92 receives data from controller 42 via a similar communication line 108, typically in the form of a conductor bundle or instrumentation harness.

As illustrated schematically in FIGS. 1A and 1B, in addition to supplying command signals to controller 42, FNRP lever 72 is coupled to controller 42 through a neutral relay circuit 110 and a neutral latch circuit 112 for selectively placing and maintaining transmission 14 in a neutral condition. Moreover, FNRP lever 72 is also coupled to a limp home relay circuit 114 for selectively permitting vehicle 10 to be placed in preselected limp home gear ratios in the event of a system failure. The preferred structure and function of relay circuits 110, 112 and 114 will be described in greater detail below. Neutral latch relay circuit 112, a park switch (described below) and controller 42 are coupled to a plug connector 116 through which controller 42 provides control signals for regulating the operation of transmission 14. In normal operation, plug connector 116 is joined to a mating connector 118, whereas the latter mating connector 118 may be coupled to a limp home plug connector 120 for providing alternative circuitry paths ensuring limited transmission operation in the event of system failure as described below.

At the direction of control signals from controller 42, communicated through plug connectors 116 and 118, transmission 14 may be engaged in several distinct gear ratios via a hydraulic circuit that includes a fluid pump 122, fluid conditioning valving 124 and directional control valving 126. Pump 122 may be of any suitable type, such as a hydraulic gear pump, and win typically be coupled to engine 12 for pressurizing hydraulic for use in engaging selected clutches of transmission 14. Fluid conditioning valving 124 typically includes a pressure relief valve (not shown) for limiting system pressure, as well as appropriate pressure regulating valves as are well known in the art. Directional control valving 126 includes a bank of spring-biased, two-position, three-way valves of known construction, plumbed to receive pressurized fluid from valving 124 and to selectively direct the fluid to transmission 14. Each directional control valve in valving 126 includes a solenoid which may be energized by a control signal from controller 42 to shift the associated valve from a closed position to an open position to actuate or engage a fluid clutch within transmission 14.

Figure 2:
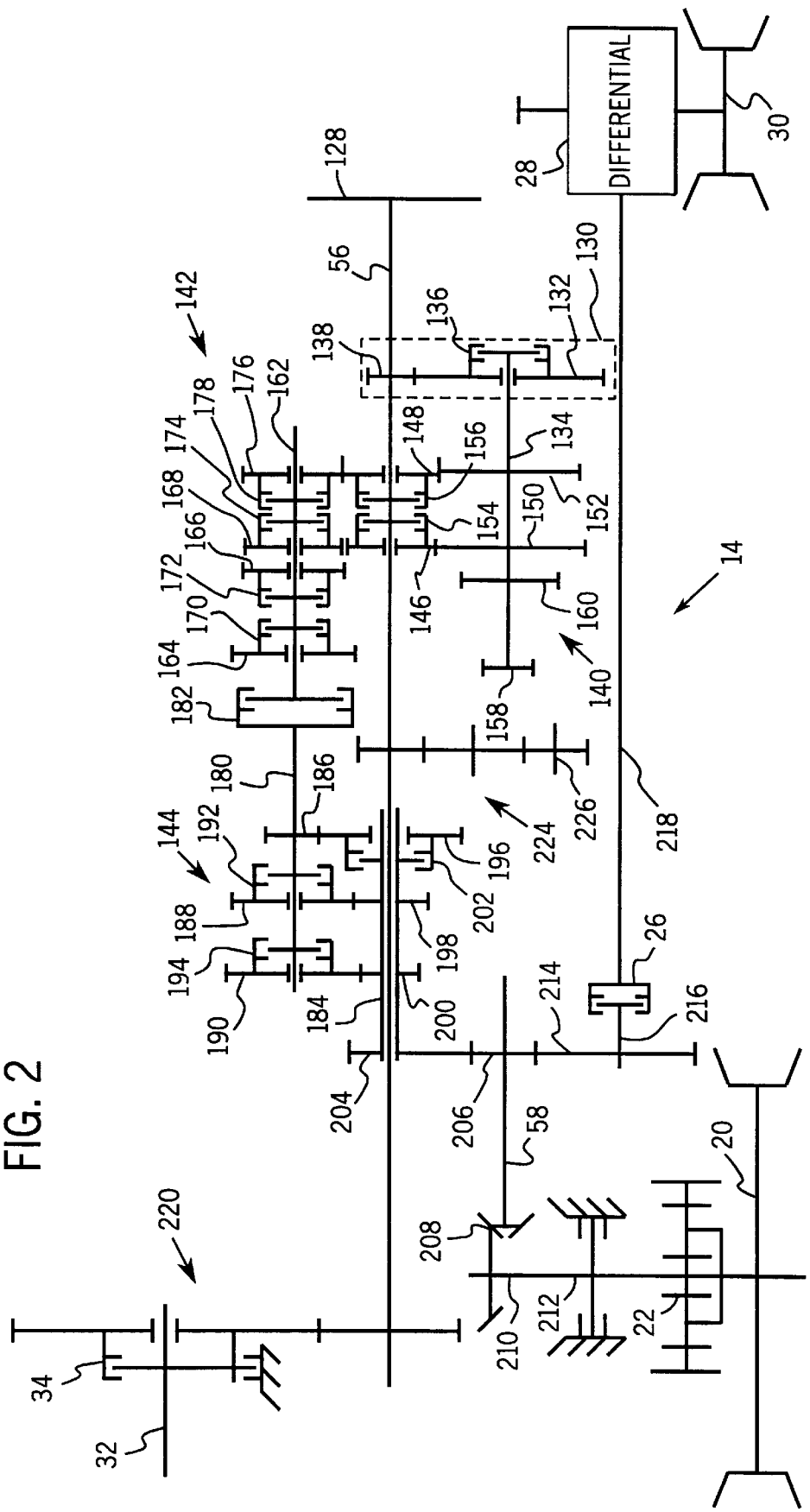
FIG. 2 is a diagrammatical view of a vehicle transmission of the type controlled by the system illustrated in FIGS. 1A and 1B.

Turning more particularly to the structure and operation of transmission 14, while any one of a variety of transmissions may be controlled by control system 38, FIG. 2 illustrates diagrammatically the presently preferred configuration. Transmission 14 is of a type known generally as a "powershift transmission," wherein several sets of gears are associated with transmission shafts and certain of the gears may be selectively rotationally fixed with respect to their shafts by engagement of an associated fluid clutch to define desired gear ratios between input shaft 56 and output shaft 58. In the transmission illustrated in FIG. 2, an engine drive plate 128 is driven in rotation by the vehicle engine. Drive plate 128 is coupled to transmission input shaft 56 and powers drive shaft 56 in rotation. Gear sets, along with associated fluid clutches and transmission shafts permit a number of different gear ratio combinations to be defined for driving transmission output shaft 58 at desired speeds as follows.

A creeper gear set 130 includes a creeper gear 132 mounted on and rotational with respect to a second transmission shaft 134. A creeper clutch 136 is engageable to lock creeper gear 132 against rotation on shaft 134. Creeper gear set 130 also includes a gear 138 fixed to shaft 56 and continuously meshing with creeper gear 132. Engagement of creeper clutch 136 results in driving shaft 134 through gears 138 and 132 to obtain an extremely slow output speed of shaft 58. Creeper gear set 130 may be optionally excluded from transmission 14.

Transmission 14 includes three groups of gear sets, identified in FIG. 2 by the reference numerals 140, 142 and 144. First group 140 includes first and second gears 146 and 148 supported on and rotational with respect to shaft 56. Additional gears 150 and 152, fixed on second shaft 134 mesh continuously with gears 146 and 148, respectively. Fluid clutches 154 and 156 are associated with gears 146 and 148, respectively, and may be engaged to lock their associated gear against rotation on shaft 56. In operation, either clutch 154 or clutch 156 is engaged to obtain an input-to-output gear ratio, or both clutches may be released or disengaged to interrupt the transmission of power to shaft 134. In the preferred embodiment shown, gear combination 146 and 150 define a ratio 34:39, while gears 148 and 152 have a ratio of 37:37.

Second gear set group 142 includes gear 150, as well as to additional gears 158 and 160, all fixed on second shaft 134. Supported on a third transmission shaft 162 and rotational with respect to third shaft 162, three gears 164, 166 and 168 mesh continuously with gears 158, 160 and 152, respectively. Fluid clutches 170, 172 and 174 are associated with gears 164, 166 and 168, respectively, and may be engaged to lock the associated gear against rotation on shaft 162. Thus, either one of clutches 170, 172 or 174 may be engaged to transmit power between second shaft 134 and third shaft 162, or all of the clutches may be released to interrupt power transmission between the shafts. In the preferred embodiment illustrated, gear combination 158 and 164 provide a gear ratio of 29:44, combination 160 and 166 provide a ratio of 34:39, and combination 150 and 168 provide a ratio of 39:34.

A reverse gear set is provided adjacent to second gear set group 142 on shaft 162, and includes a reverse gear 176 mounted on and rotational about shaft 162. A reverse clutch 178 is associated with reverse gear 176 and may be engaged to lock reverse gear against rotation with respect to shaft 162, placing transmission 14 in one of several reverse gear ratios.

Third shaft 162 is aligned with and may be selectively coupled to a fourth transmission shaft 180 via a master clutch 182. Thus, when master clutch 182 is fully engaged, shaft 180 rotates at the same speed and in the same direction as shaft 162. As discussed below, master clutch 182 is preferably modulated into and out of engagement, such as by pulse-width-modulating a proportional directional control valve (not shown) included in valving 126. However, master clutch 182 may be mechanically or electro-mechanically modulated by techniques well known in the art.

Third gear set group 144 selective couples shaft 180 with a further shaft 184 disposed about shaft 56. Third gear set group 144 includes a first gear 186 fixed to shaft 180, and a pair of gears 188 and 190 supported on and rotational with respect to shaft 180. Clutches 192 and 194 are associated with gears 188 and 190, respectively, and may be engaged to lock the associated gear against rotation on shaft 180. Gears 186, 188 and 190 mesh continuously with corresponding gears 196, 198 and 200, respectively, on shaft 184. Gear 196 is supported on and rotational with respect to shaft 184, whereas gears 198 and 200 are fixed to shaft 184. A fluid clutch 202 is associated with gear 196 and may be engaged to lock gear 196 against rotation on shaft 184. Thus, by selectively engaging either clutch 192, 194 or 202, shaft 184 is caused to rotate at a predetermined speed ratio as shaft 180 is driven in rotation. In the presently preferred embodiment, gear combination 186 and 196 provide a gear ratio of 22:54, combination 188 and 198 provide a ratio of 37:39, and combination 190 and 200 provide a ratio of 52:24.

Shaft 184 transmits power to transmission output shaft 58 through gears 204 and 206, fixed on shafts 184 and 58 respectively and arranged to continuously mesh with one another. As illustrated in FIG. 2, output shaft 58 transmits power to rear axle 20 through bevel gears 208 arranged to drive a differential input shaft 210. A master brake 212 is provided on shaft 210 for braking vehicle 10. In addition to driving rear axle 20, in the preferred embodiment illustrated in FIG. 2, gear 206 carried by output shaft 58 meshes with a further gear 214 supported on a front wheel drive clutch shaft 216. A front wheel drive shaft 218 may be selectively coupled to clutch shaft 216 by front wheel drive clutch 26, and extends to front wheel drive differential 28 for driving front axle 30.

In addition to the gearing described above, transmission 14 is preferably arranged for driving power take off shaft 32 via power take off gearing 220, including power take off clutch 34. Transmission 14 also includes gearing, designated generally by the reference numeral 224, for driving a pump drive shaft 226.

All of the clutches contained in transmission 14 are preferably fluid clutches of a type well known in the art. Such clutches are typically biased in a disengaged position and engageable by the application of pressurized fluid. Moreover, while clutches 154, 156, 170, 172, 174, 178, 192, 194 and 202 may be modulated into and out of engagement, such as by gradually shifting a proportional hydraulic valve in valving 126, in the presently preferred embodiment, these clutches are engaged by hydraulic valves that are shifted directly between pressure transmitting and pressure relieving positions. However, to permit smooth transitions in shifting, master clutch 182 is preferably modulated into and out of engagement by pulse width modulating a proportional directional control valve in valving 126. Thus, direct shifting between selected gears, commonly known in the art as power shifting, may be performed by disengaging outgoing clutches (corresponding to the gear ratio being shifted from) while engaging incoming clutches (for the gear ratio being shifted to), in a coordinated and timed manner with master clutch 182 engaged. In appropriate situations where transmission 14 is to be shifted over a broad range of gear ratios, certain intermediate gear ratios may be skipped, in accordance with a technique well known in the art as "skip shifting." On the other hand, modulated shifting may be commanded by fully engaging clutches corresponding to a desired gear ratio with master clutch 182 disengaged, then modulating engagement of master clutch 182. Such modulated shifting is extremely useful in certain shifting situations, such as starting from a stop and shuttle shifting between forward and reverse gear ratios.

In the presently preferred embodiment, controller 42 may command all of these types of shifting depending upon the operating conditions of transmission 14. Techniques for power shifting, skip shifting and modulated shuttle shifting are well known in the art. By way of example, such techniques are described in U.S. Pat. No. 4,967,385, issued on Oct. 30, 1990 to Brekkestran et al. and assigned to J. I. Case Company, which is hereby incorporated herein by reference. As will be appreciated by those skilled in the art, transmission 14 may execute power shifts and skip shifts both while upshifting to higher gear ratios in the same direction and while downshifting to lower gear ratios in the same direction. Similarly, transmission 14 may execute modulated shuttle shifts both from forward gear ratios to reverse gear ratios and vice versa.

By engaging combinations of clutches, transmission 14 establishes a number of predetermined gear ratios between input shaft 56 and output shaft 58. In particular, for the transmission illustrated in FIG. 2, the following gear ratios are provided (the prefixes F, R, C and CR representing forward, reverse, forward creeper and reverse creeper gear ratios, respectively):

| Gear ratio | Clutches engaged |
|---|---|
| F1 | 154, 170, 202 |
| F2 | 156, 170, 202; |
| F3 | 154, 170, 202; |
| F4 | 156, 172, 202; |
| F5 | 154, 172, 202; |
| F6 | 156, 174, 202; |
| F7 | 154, 170, 192; |
| F8 | 156, 170, 192; |
| F9 | 154, 172, 192; |
| F10 | 156, 172, 192; |
| F11 | 154, 174, 192; |
| F12 | 156, 174, 192; |
| F13 | 154, 170, 194; |
| F14 | 156, 170, 194; |
| F15 | 154, 172, 194; |
| F16 | 156, 172, 194; |
| F17 | 154, 174, 194; |
| F18 | 156, 174, 194; |

-continued

| Gear ratio | Clutches engaged |
|---|---|
| R1 | 154, 178, 202; |
| R2 | 156, 178, 202; |
| R3 | 154, 178, 192; |
| R4 | 156, 178, 192; |
| C1 | 136, 170, 202; |
| C2 | 136, 172, 202; |
| C3 | 136, 174, 202; |
| C4 | 136, 170, 192; |
| C5 | 136, 172, 192; |
| C6 | 136, 174, 192; |
| CR1 | 136, 178, 202; |
| CR2 | 136, 178, 192. |

It should be noted that for forward gear ratios, only one clutch of each gear set group 140, 142 and 144 is engaged. Similarly, for reverse gear ratios, the reverse gear clutch 178 is engaged along with a clutch from the first and third gear set groups 140 and 144. Moreover, for creeper gear ratios, the creeper clutch 136 is engaged along with a clutch from the second gear set group 142 (or the reverse gear clutch 178) and a clutch from the third gear set group 144. As mentioned above, all gear combinations require engagement of master clutch 182 for transmission of power through transmission 14.

Figure 3A:
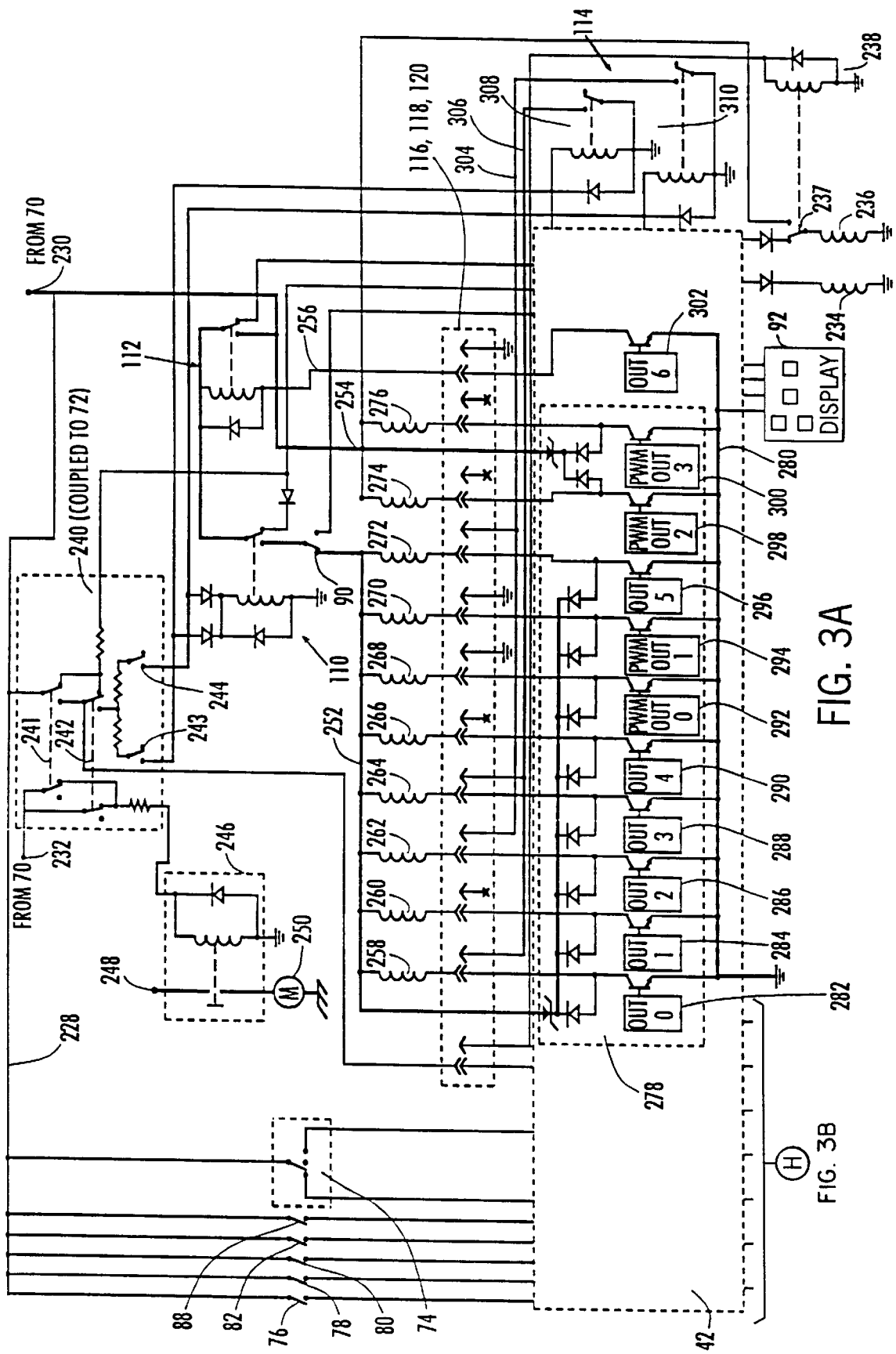
FIGS. 3A and 3B are a schematic diagram of a presently preferred embodiment of control circuitry for the control system of FIGS. 1A and 1B.
Figures 3A, 3B:
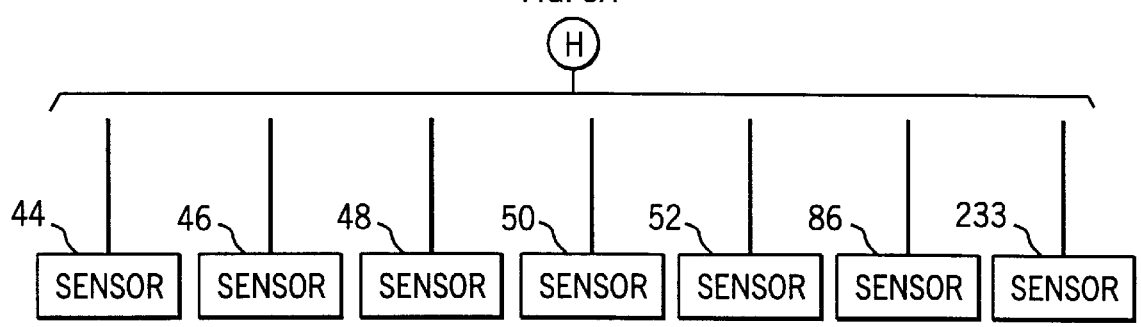
Figure 4:
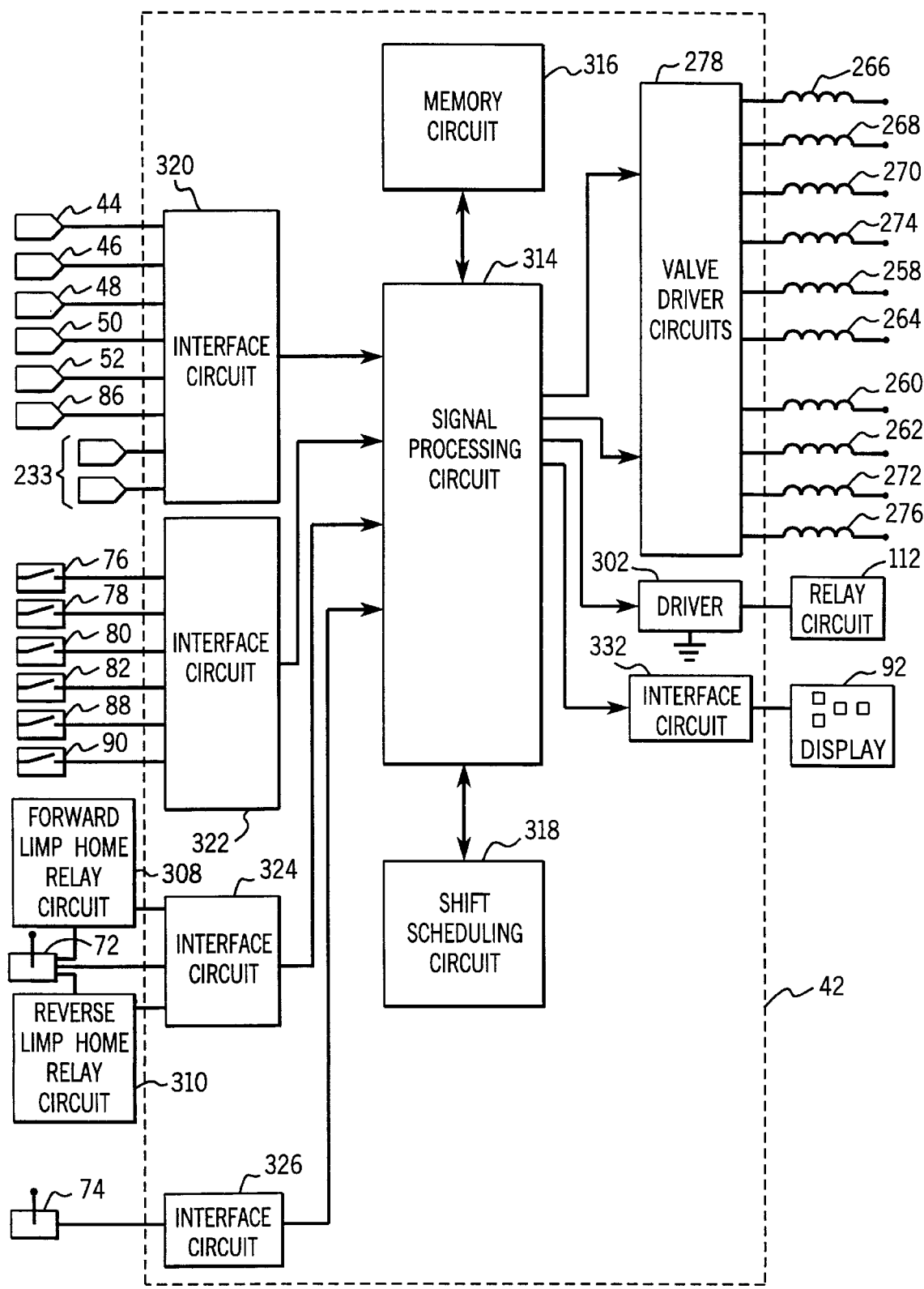
FIG. 4 is a block diagram illustrating certain functional circuitry included in the control system of FIGS. 1A and 1B.

In the presently preferred embodiment of control system 38, controller 42 includes a programmed digital microprocessor, memory circuitry and interface and signal conditioning circuitry for receiving input signals from the sensors and command devices discussed above and for applying control signals to directional control valving 126 coupled to transmission 14. FIGS. 3A and 3B illustrates the presently preferred arrangement and interconnection between the various components of control system 38, while FIG. 4 shows the flow of certain key signals in the system between functional circuitry included in controller 42. Turning first to FIGS. 3A and 3B, a voltage supply line 228 is indicated as coupled to a lead 230 from key switch 70. Lead 230 couples line 228 to a source of electrical power (i.e. the electrical system of vehicle 10), when key switch 70 is placed in a "run" position. Key switch 70 is also coupled to a second lead 232 which receives electrical power when key switch 70 is placed in a "start" position. As shown in FIG. 3, auto/manual switch 76, diagnostic switch 78, creeper switch 80, additional switches 82 and top-of-clutch switch 88 are coupled between power line 228 and controller 42. Thus, when each switch is closed, a corresponding power signal is applied to an input of controller 42. Bump lever 74 is similarly coupled between power line 228 and controller 42. Bump lever 74 is biased in a center or neutral position in which it applies no signal to controller 42, and is movable to increment and decrement positions in which corresponding increment and decrement signals are applied to controller 42. Also as illustrated in FIGS. 3A and 3B, sensors 44, 46, 48, 50 52 and 86 are coupled to inputs of controller 42, whereas display 92 is coupled to outputs of controller 42. Controller 42 may include other inputs for additional sensors, designated generally at 223 in FIGS. 3A and 3B, such as transmission oil temperature sensors, pressure sensors and the like.

It should be noted that, while the various sensors and command devices discussed above are shown and described as dedicated devices included in control system 38 and coupled directly to controller 42, where vehicle 10 includes similar or redundant devices as part of other on-board control systems, controller 42 may be coupled to a data bus or similar data sharing circuit and obtain signals for control of transmission 14 as required from the data bus. Similarly, signals generated by sensors and command devices included in control system 38 may be shared by other on-board control systems via a data bus.

As shown in FIG. 3, control system 38 includes a creeper solenoid coil 234 coupled to an output of controller 42 for shifting a hydraulic directional control valve in valving 126 for directing pressurized fluid to creeper clutch 136. In addition, a park solenoid coil 236 is coupled to an additional output of controller 42 through a park contact 237 opened and closed by a limp home park relay circuit 238. Park solenoid coil 236 may be energized by controller 42 or by operation of limp home park relay circuit 238 as described below.

An FNRP circuit 240 is electrically coupled to power supply line 228 and to lead 232, and mechanically coupled to FNRP lever 72. FNRP circuit 240 includes a park switch 241, a neutral switch 242, a forward switch 243 and a reverse switch 244. Park switch 241 receives power from supply line 228, as does neutral switch 242. Park switch 241 is closed by placing lever 72 in its "park" position. Park switch 241 and neutral switch 242 are, in turn, coupled to a starter relay circuit 246 and to neutral latch circuit 112 as shown in FIGS. 3A and 3B for preventing vehicle 10 from starting in a condition in which vehicle 10 may inadvertently move due to gear engagement as described below. When FNRP lever 72 is moved into its "neutral" position, neutral switch 242 is closed, while forward and reverse switches 243 and 244 are open. When FNRP lever 72 is then moved to a "forward" or "reverse" position, neutral switch 242 is opened and the corresponding forward or reverse switch 243 or 244 closed.

Starter relay circuit 246 is coupled to a power source, such as to the vehicle electrical system, through a lead 248. Lead 248 delivers an energizing signal to the vehicle starter 250, but may do so only when relay circuit 246 closes a connection between lead 248 and starter 250. Relay circuit 246 is powered only when park switch 241 or neutral switch 242 is closed (i.e. when FNRP lever 72 is in its "park" or its "neutral" position). Thus, park switch 241, neutral switch 242 and starter relay circuit 246 interrupt power to starter 250 when FNRP lever 72 is its "forward" or "reverse" positions, thereby preventing starter 250 from being energized through normal means (i.e. by turning key switch 70 to its "start" position) unless transmission 14 is placed in a neutral or parked condition (i.e. disengaged).

Neutral latch circuit 112 and neutral relay circuit 110 are arranged to provide power to drive directional control valving 126 via power supply lines 252 and 254 as follows. Neutral latch circuit 112 includes a relay coil coupled to controller 42 through a ground connection 256. In normal operation, controller 42 grounds neutral latch circuit 112 to enable its energization. As discussed below, controller 42 may interrupt this ground connection to disable or unlatch circuit 112 when desired. In FIGS. 3A and 3B, neutral latch circuit 112 is illustrated in its unlatched or open position, wherein neutral latch circuit 112 permits no power to flow from supply line 228 to supply line 252. However, when FNRP lever 72 is placed in a neutral position, closing neutral switch 242, power is allowed to flow through neutral latch circuit 112 to ground through controller 42, thereby energizing the coil of neutral latch 112, closing the relay. Because power then flows to the relay coil from supply line 228, the relay remains latched. Neutral latch circuit 112 thus disables transmission 14 unless and until FNRP lever 72 is placed in a neutral position and key switch 70 is moved to its "run" position. Once these two criteria are satisfied, latch 112 remains energized until key switch 70 is moved out of its "run" position or until controller 42 interrupts ground connection 256.

Neutral relay circuit 110 is coupled between neutral latch circuit 112 and supply line 252. Neutral relay circuit 110 is enabled upon energization of neutral latch relay 112, and itself is energized when either forward switch 243 or reverse switch 244 is closed by moving FNRP lever 72 to its forward or reverse position. When either switch 243 or 244 is thus closed, the coil of relay circuit 110 is energized, drawing the relay closed and providing power to supply line 252. Subsequently, when FNRP lever 72 is moved to its neutral position, opening both forward and reverse switches 243 and 244, power is interrupted to neutral relay circuit 110, causing the relay to open and interrupting power to supply line 252. Neutral relay circuit thus disables transmission 14 by interrupting power to valving 126 when FNRP lever 72 is placed in a neutral position. It should be noted that bottom-of-clutch switch 90 also is located in series between neutral relay 110 and supply line 252. When an operator depresses clutch pedal 84 fully to a bottom-of-clutch position, switch 90 shifts from the closed position illustrated in FIGS. 3A and 3B to an open position, thereby interrupting power to supply line 252, placing transmission 14 in neutral and applying a bottom-of-clutch signal to controller 42.

As discussed above, each directional control valve included in valving 126 includes a solenoid coil that is energized to shift the corresponding valve, permitting pressurized fluid to flow to a clutch of transmission 14. The solenoid coils for valving 126 are illustrated schematically in FIGS. 3A and 3B. In the presently preferred embodiment, eight such solenoid coils, 258, 260, 262, 264, 266, 268, 270 and 272, are electrically coupled to supply line 252 for engaging clutches 154, 156, 202, 192, 194, master clutch 182, clutch 170 and reverse clutch 178, respectively. Two additional coils, 274 and 276 are coupled to supply line 254 for engaging clutches 172 and 174, respectively. Coils 258 through 276 are, in turn, coupled to solenoid driver circuits 278 in controller 42 which selectively couple the coils to a common ground line 280, thereby energizing the coil to shift an associated valve and engage a clutch. In the presently preferred embodiment, valve drivers 278 include on/off-type drivers 282, 284, 286, 288, 290 and 296, coupled to coils 258, 260, 262, 264, 266 and 272, respectively. Several pulse-width-modulated drivers 292, 294, 298 and 300, are provided for driving coils 268, 270, 274 and 276, respectively. It should be noted that in the present implementation of control circuit 38, only master clutch 182, engaged by coil 268 through pulse-width-modulated driver 294 is engaged and disengaged by modulation. Other pulse-width-modulated drivers 292, 298 and 300 either fully energize or fully de-energize their associated valve coils. However, the provision of these pulse-width-modulated drivers is preferred to permit future adaptation of controller 42 for additional clutch modulation tasks.

In addition to valve drivers 278, controller 42 includes an additional switching circuit 302 coupled to ground connection 256 from neutral latch circuit 112. Switching circuit 302 is electrically coupled to common ground line 280 and permits controller 42 to selectively unlatch neutral latch circuit 112, thereby interrupting power to supply lines 252 and 254, disabling valve coils 258 through 276 and placing transmission 14 in neutral. In normal operation, however, controller 42 maintains circuit 302 closed, thereby grounding connection 256.

It will be noted that valve coils 274 and 276 are coupled to power supply line 254, which receives electric power when key switch 70 is in a "run" position, energized even when vehicle 10 is in neutral or park. Thus, controller 42 may energize coils 274 and 276 to engage clutches 172 and 174 although the remainder of the valve solenoids are disabled. In the presently preferred embodiment, controller 42 engages clutches 172 and 174 when FNRP lever 72 is placed in its "neutral" or "park" position for more than 0.1 second, thereby locking intermediate transmission shaft 162 against rotation. Locking shaft 162 against rotation effectively defeats hydraulic drag within transmission 14 that might otherwise tend to transmit some torque through the transmission to one or more output shaft. The time delay in locking shaft 162 permits the vehicle operator to traverse the "neutral" and "park" positions quickly without engaging clutches 172 and 174. In addition, transmission 14 includes a locking pawl (not shown), spring biased into an engaged position wherein it blocks rotation of at least output shaft 58. During normal (i.e. non-parked) operation of transmission 14, the pawl is held in a non-engaged position by energizing park solenoid coil 236 via an appropriate control signal from controller 42. When FNRP lever 72 is placed in its "park" position, however, controller 42 de-energizes coil 236, thereby releasing the pawl and preventing rotation of the transmission output shaft.

As illustrated in FIGS. 3A and 3B, park switch 241, valve coils 258 through 276, and ground connection 256 are coupled to controller 42 through harness connectors 116 and 118. The connections illustrated in FIGS. 3A and 3B represent those present when connectors 116 and 118 are mated, as for normal operation of transmission 14. Upon the occurrence of certain system failures, such as failure of controller 42, control system 38 may be placed in a "limp home" configuration by uncoupling connector 116 from connector 118 and mating connector 118 with limp home connector 120 in a manner generally known in the art. The circuit connections present in the limp home configuration of connectors 118 and 120 are those made by shifting the upper lines entering the box shown in broken lines in FIG. 3, to the right one step. Thus, coils 260, 266, 274 and 276 make no connection in the limp home configuration, while coils 262 and 272 are coupled to a first alternative grounding line 304 and coils 258 and 264 are coupled to a second alternative grounding line 306. It should also be noted that in the limp home configuration, valve coils 268 and 270 are coupled directly to ground, resulting in engagement of clutch 170 and master clutch 182. In addition, ground line 256 from neutral latch circuit 112 is grounded in the limp home configuration, while parking switch 241 is coupled directly to limp home park relay circuit 238.

Alternative grounding lines 304 and 306 are coupled to reverse and forward limp home relay circuits 310 and 308, respectively. Forward limp home relay circuit 308 is, in turn, directly coupled to forward switch 243, while reverse limp home relay circuit 310 is directly coupled to reverse switch 244. With connectors 118 and 120 thus mated in the limp home configuration described above, forward limp home relay circuit 308 is closed by moving FNRP lever 72 to its forward position, thereby closing forward switch 243. Similarly, reverse limp home relay circuit 310 is closed by moving FNRP lever 72 to its reverse position, thereby closing reverse switch 244. Energizing forward limp home relay circuit 308 grounds line 306, thereby energizing coils 266 and 258, engaging clutches 172 and 156, and placing transmission 14 in the 8th forward gear. Energizing reverse limp home relay circuit 310 grounds line 304, thereby energizing coils 262 and 272, and placing transmission 14 in the 1st reverse gear. This limited limp home operation of transmission 14 permits an operator to transport vehicle 10 in the event of a system failure, including failure of controller 42.

It should be noted that limp home park relay circuit 238 is energized when connectors 118 and 120 are mated in the limp home configuration and FNRP lever 72 is placed in positions other than its "park" position. When energized, relay circuit 238 shift contacts 237, electrically connecting park solenoid coil 236 between power line 254 and ground, energizing coil 236 and thereby withdrawing the parking pawl from its engaged position to permit vehicle 10 to move. When FNRP lever 72 is moved to its "park" position, power is interrupted to circuit 238, releasing contact 237 to return to the position shown in FIGS. 3A and 3B and de-energizing coil 236 to release the pawl.

As illustrated in FIGS. 3A, 3B and 4, signals from sensors 44, 46, 48, 50, 52, 86 and 233, and from switches 76, 78, 80, 82, 88 and 90 are applied to controller 42 via their respective communication links. Similarly, the states of FNRP lever and bump lever 74 are communicated to controller 42. In the presently preferred embodiment, controller 42 is a microprocessor-based digital controller including a signal processing circuit 314, typically configured through appropriate coding of a microprocessor, such as an Intel 80C198 microcontroller. Controller 42 further includes appropriate memory circuitry 316, which preferably includes electronically erasable programmable read only memory (EEPROM) and random access and read only memory (RAM and ROM) for storing a preset, cyclic transmission control routine implemented by signal processing circuit 314, calibration values for the various clutches and other calibrated components of control system 38, as well as various temporarily stored values used by controller 42, such as command values, sensed values and the like. A shift scheduling circuit 318, illustrated in FIG. 4 as separate from signal processing circuit 314 and memory circuit 316, but typically configured via coding within the microprocessor, functions with signal processing circuit 314 to schedule shifts into and out of gear ratios based upon the control routine executed by signal processing circuit 314.

Signal processing circuit 314 preferably includes an on-board analog-to-digital converter (not represented in FIG. 4) for converting input parameter signals directly to digital signals for processing. However, controller 42 will typically include interface circuits 320, 322, 324 and 326 for converting and conditioning the sensed and command signals produced by the system sensors and command devices into filtered signals and for isolating signal processing circuit 314 from power surges and the like. Moreover, controller 42 includes valve driver circuits 278, discussed above for converting control signals output by signal processing circuit 314 into drive signals for energizing valve coils 266 through 276. Neutral latch circuit 112 is also coupled to signal processing circuit 314, which monitors the state of circuit 112 and controls grounding of circuit 112 via driver 302. Display 92 is coupled to signal processing circuit 314 through an interface circuit 332. The particular configuration of interface circuits 320, 322, 324, 326 and 332 will vary depending upon the particular sensors, command devices and signal processing circuitry employed in the system. The construction and operation of such interface circuitry is well known to those skilled in the art.

In operation, sensors 44 through 52, 86 and 233 continuously apply their sensed parameter signals to interface circuit 320, which filters and converts these signals to a range and form usable by signal processing circuit 314. Similarly, command devices 72 through 82, 88 and 90 apply signals to signal processing circuit 314 via their respective interface circuits 324 and 326, signal processing circuit 314 typically accessing the various command signals periodically as required by the transmission control routine stored in memory circuit 316. When automatic/manual switch 76 is placed in its "manual" position, transmission 14 may be shifted upon direct command from the vehicle operator by manipulation of clutch pedal 84 and levers 72 and 74. When automatic/manual switch 76 is placed in its "automatic" position, however, signal processing circuit 314 cycles through the transmission control routine as accessed from memory circuit 316 and, based upon the input and command signals applied by the sensors and command devices, determines when and how transmission 14 is to be shifted between the gear ratios described above, as well as when portions of control system 38 should be disabled, such as by interrupting the ground to neutral latch circuit 112. As will be appreciated by those skilled in the art, memory circuit 316 stores as part of the control routine, a table of gear ratios available through particular combinations of transmission clutches as described above. Shifts selected by signal processing circuit 314 are based upon these preset combinations. The overall transmission control routine may include various subroutines for controlling transmission operation in specific situations, such as for ground-speed-matching. Generally, however, the overall control routine permits modulated shifting, including modulated shuttle shifting, skip shifting and power shifting, all of which are techniques well known in the art.

Signal processing circuit 314 cooperates with shift scheduling circuit 318 to schedule the shifts (i.e. engagement and disengagement of combinations of clutches) identified by signal processing circuit 314. As mentioned above, in the presently preferred embodiment, signal processing circuit 314 and shift scheduling circuit 318 are configured in a programmed microprocessor, shift scheduling circuit 318 effectively being an aspect or subroutine of the overall control routine, adapted to schedule disengagement of "outgoing" clutches and engagement of "incoming" clutches to obtain smooth transitions between gear ratios. Based upon this scheduling, signal processing circuit 314 generates appropriate control signals to energize and de-energize coils 266 through 276, and applies these control signals to the coils through driver circuits 278 to execute the selected shifts.

In normal operation, a vehicle operator typically configures control system 38 for automatic or manual operation by manipulating automatic/manual switch 76. The operator may then preselect forward and reverse commanded gear ratios, which are displayed on display 92. In the preferred embodiment, these gear ratios may be preselected by the vehicle operator. Controller 42 will then schedule shifts to obtain the commanded gear ratio upon FNRP lever 72 being moved to either its "forward" or "reverse" position. Such shifting will typically be accomplished through the use of skip shifting, shuttle shifting and power shifting techniques as discussed above. During steady state operation of vehicle 10 in either the forward or the reverse direction, the preselected gear ratios indicated on display 92 will generally be engaged as the commanded gear ratio, unless changed by the operator. The operator may then increment or decrement the commanded gear ratio by moving bump lever 74 to its "increment" or "decrement" position. Bump lever 74 may be held in either position to increment or decrement the commanded gear ratio through more than one ratio. Bump lever 74 is released once the desired commanded gear ratio is reached.

Figure 5:
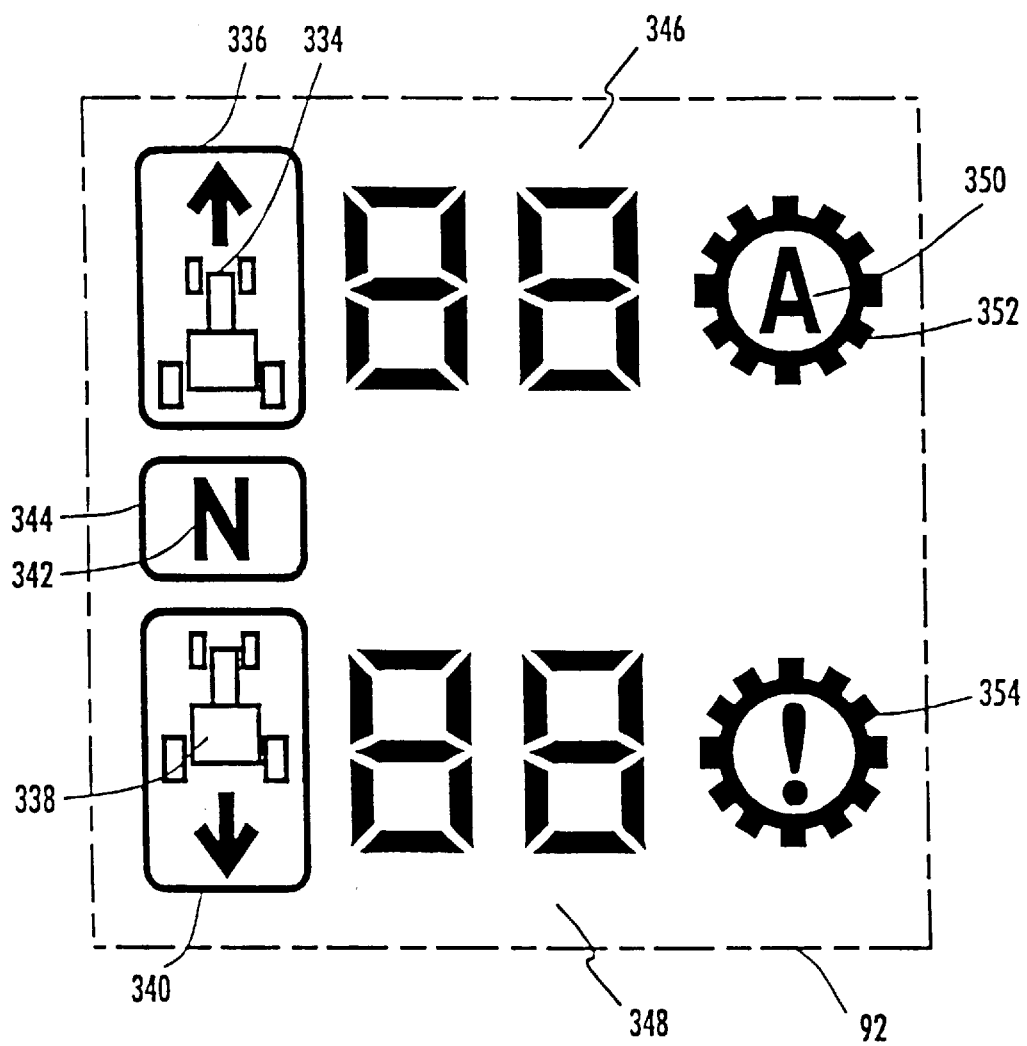
FIG. 5 illustrates a portion of a control panel display in accordance with the presently preferred embodiment, indicating information available to the vehicle operator during operation of the control system.

In addition to applying control signals to coils to engage and disengage transmission clutches, signal processing circuit outputs signals to display 92 to provide the vehicle operator with information on the operation of transmission 14 and controller 42. In the presently preferred embodiment, as illustrated in FIG. 5, display 92 includes a series of icons for conveying information to the vehicle operator. These icons include a forward icon 334, a forward box 336, a reverse icon 338 and reverse box 340, and a neutral icon 342 and neutral box 344. In addition, display 92 includes forward digits 346 and reverse digits 348, an automatic icon 350 surrounded by a transmission icon 352, and a diagnostics icon 354. In the preferred embodiment, the forward, reverse, neutral and transmission icons, 334, 338, 342 and 352, respectively, are continuously visible after vehicle 10 is powered up. When FNRP lever 72 is placed in its "forward," "reverse" or "neutral" position, thereby closing forward, reverse or neutral switches, 243, 244 or 242, respectively, the corresponding box icon 336, 338 or 344 is illuminated, indicating the then current state of transmission 14. As described above, control system 38 places transmission 14 in a neutral condition upon start up, resulting in illumination of neutral box 344 until forward or reverse gear engagement. When automatic/manual switch 76 is placed in its "automatic" position, permitting controller 42 to control engagement and disengagement of transmission 14 in accordance with the particular routine stored in memory circuit 316, automatic icon 350 is illuminated. In normal operation, forward and reverse digits 346 and 348 display commanded forward and reverse gear ratios into which transmission 14 will be shifted by controller 42 upon movement of FNRP lever 72 to its "forward" or "reverse" positions as described above. However, digit displays 346 and 348 preferably permit additional information to be conveyed to the operator. For example, when FNRP lever 72 is placed in its "park" position, digit display 348 indicates the letter "P." In addition, digit displays 346 and 348 are preferably used to convey error messages for system diagnostics. When controller 42 determines that a default condition is present in system 38, diagnostic icon 354 becomes visible. Such fault conditions may include, by way of example, failure of a solenoid coil or valve driver, a difference between a detected clutch pressure and the state of a solenoid coil, open circuits and the like. Moreover, controller 42 preferably includes a diagnostics routine, of a type generally known in the art, that permits error codes indicative of such failures to be accessed from memory circuit 316. Such error codes may be conveniently displayed in two-digit code form on digit displays 346 and 348.

Figure 6:
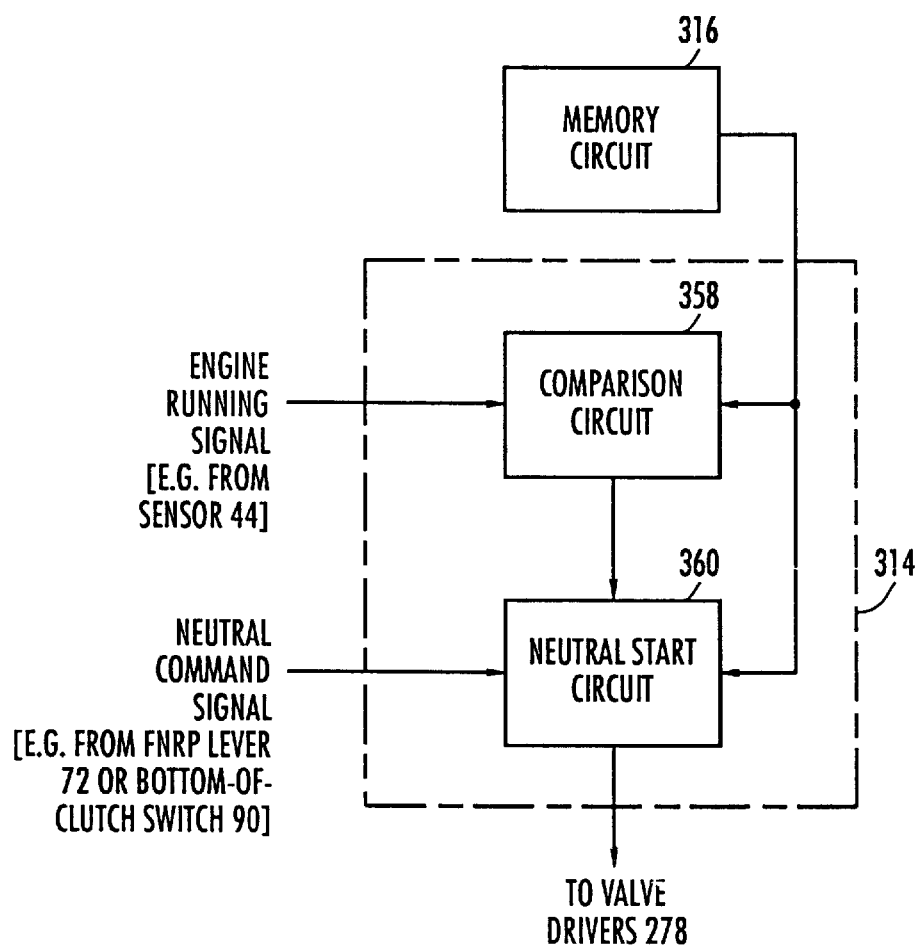
FIG. 6 is a signal flow diagram generally illustrating the flow of signals processed by the control circuit of the system shown in FIG. 4 for disabling the work vehicle transmission of FIG. 2 during startup.

In accordance with one aspect of control system 38, controller 42 implements a neutral start routine for disabling solenoid driver circuits 278 upon startup of the vehicle to place transmission 14 in a neutral condition. FIG. 6 illustrates typical functional circuitry incorporated in signal processing circuit 314, such as by appropriate programming, to carry out this neutral start routine. In particular, signal processing circuit 314 includes a comparison circuit 358 and a neutral start circuit 360. While comparison circuit 358 and neutral start circuit 360 may be configured as subroutines or the like, they are preferably configured as part of an overall transmission control routine of a type generally known in the art, such as described in U.S. Pat. No. 4,967,385, mentioned above. Comparison circuit 358 receives an engine running signal indicative of a running condition of engine 12 and compares this signal with a predetermined running threshold value stored in memory circuit 316. In the presently preferred embodiment, this engine running signal is supplied by engine shaft speed sensor 44. Thus, after startup and while engine 12 is running, sensor 44 produces a signal proportional to the rotational speed of shaft 54 and applies this signal to comparison circuit 358. By comparing this signal to the threshold value, comparison circuit 358 detects when engine 12 is operating. While the engine running signal is conveniently provided in this manner, it should be noted that a number of other input parameter states may be used as an indicator of engine running. For example, an engine oil pressure sensor (not shown) may serve to produce an engine running signal, such as by comparing an oil pressure signal to a threshold level only present when engine 12 is running.

Comparison circuit 358 applies the result of this comparison to neutral start circuit 360 for use in a neutral start routine. Neutral start circuit 360 also receives an operator-induced neutral command signal indicative that the vehicle operator has placed the transmission in a neutral condition. The neutral command signal may be supplied by FNRP lever 72 (e.g. from neutral switch 242) or by clutch pedal 84 (e.g. from bottom-of-clutch switch 90).

Figure 7A:
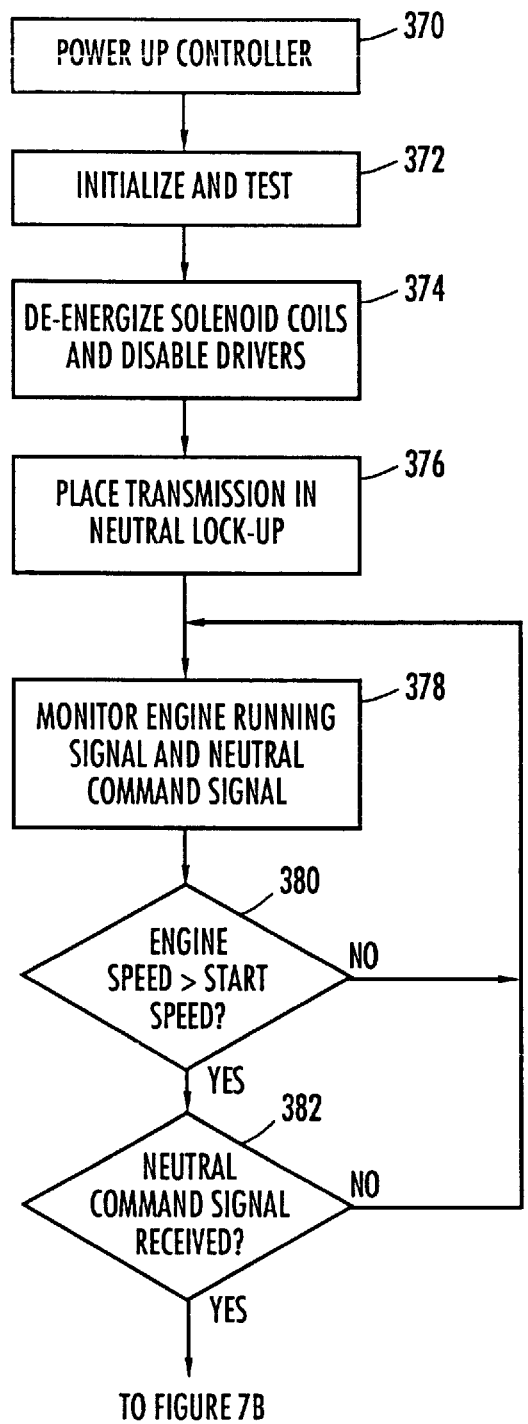
FIGS. 7A AND 7B are flow charts depicting the exemplary steps in control logic implemented by the control system of FIGS. 4 and 6 in a startup control routine.
Figure 7B:
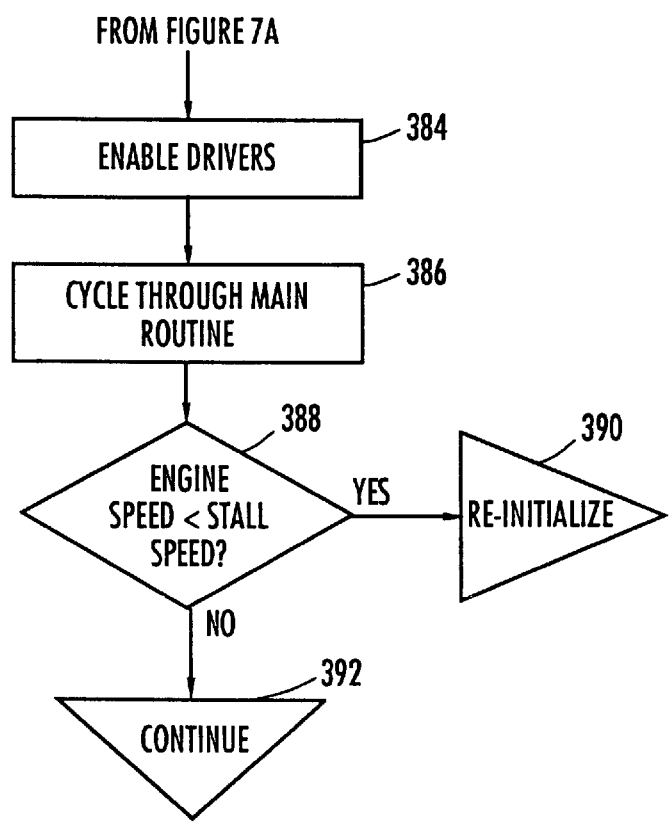

Signal processing circuit 314, including comparison circuit 358 and neutral start circuit 360, thus receives signals indicative of a running condition of engine 12 and an operator-induced neutral command, and disables or enables valve drivers 278 in accordance with a neutral start control routine to maintain transmission in a disabled state during startup of engine 12. Exemplary control logic for implementing the neutral start routine is illustrated in FIGS. 7A and 7B. As represented by block 370, the routine begins when controller 42 is powered up, such as via key switch 70. Thereafter, signal processing circuit 314 cycles through a transmission control routine stored in memory circuit 316, including programming code for permitting signal processing circuit 314 to act upon input signals for shifting transmission 14 into desired gear ratios as described above. In the control routine, controller 42 cyclically checks the status of the various inputs and enters subroutines or similar logical processes based upon these inputs. Following step 370, signal processing circuit 314 enters into an initialization and internal test sequence at step 372. During this sequence, which lasts approximately 2 seconds, all solenoid coils are de-energized and driver circuits 278 are disabled or prevented from transmitting current through the solenoid coils, as indicated at step 374. Upon completion of the initialization period, controller 42 begins testing for jump start conditions as described below, and transmission 14 is placed in neutral lockup by energizing coils 274 and 276, as shown at step 376.

Normally during this startup period, neutral relay circuit 112, in conjunction with FNRP lever 72 will disable starter 250 and prevent engine 12 from starting when FNRP lever 72 is in other then its "neutral" position. However, if starter 250 is directly connected to a voltage source, such as for jump starting vehicle 10, engine 12 may be started with FNRP lever 72 in any position. To prevent vehicle 10 from moving in such situations, transmission controller 42 will refuse to leave neutral until FNRP lever 72 has been through a neutral position (or bottom-of-clutch switch 90 has been closed) at least once since engine 12 is running.

Thus, as indicated at step 378, signal processing circuit 314 monitors the engine running and neutral command signals generated by speed sensor 44 and neutral switch 242, respectively. At step 380, comparison circuit 358 compares the engine running signal to a running threshold value stored in memory circuit 316. In the presently preferred embodiment, a starting speed value corresponding to an engine rotational speed of 500 RPM is used as the running threshold value at step 380. If the engine speed is not greater than the threshold value, signal processing circuit 314 continues to monitor the signals (i.e. returns to step 378). However, if the engine speed exceeds the threshold value, signal processing circuit proceeds to step 380. At step 380, neutral start circuit 360 checks whether the neutral command signal has been received. If the signal has not been received, signal processing circuit 314 continues to monitor the signals (i.e. returns to step 378). In order to proceed past step 382, a vehicle operator must place FNRP lever 72 in its "neutral" position. Alternatively, the operator may depress clutch pedal 84 to close bottom-of-clutch switch 90, which similarly places transmission 14 in a neutral condition.

Once the engine running and neutral command signals indicate that engine 12 is running and transmission 14 is commanded to a neutral condition, signal processing circuit 314 proceeds to step 384, where all drivers are enabled. From step 384, signal processing circuit 314 continues to cycle through the main transmission control routine stored in memory circuit 316, as indicated generally at step 386. As part of this control routine, signal processing circuit 314 periodically monitors the engine running signal and compares it to a stall threshold value, as shown at step 388. In the presently preferred embodiment, an engine speed signal from speed sensor 44 is compared to a threshold value corresponding to an engine speed of approximately 500 RPM. If the engine speed is lower than the stall value, controller 42 must be re-initialized, as shown at step 390. However, if the engine speed is not smaller than the stall value, signal processing circuit continues to cycle through the main control routine, as indicated at step 392. Re-initialization of controller at step 42 requires that the operator "key-off" by switching key switch 70 out of its "run" position, and re-enter the startup sequence at step 370. Therefore, if engine 12 successfully starts, such that controller 42 passes through steps 380 and 382 to enable all driver circuits 278, then stalls, the driver circuits originally disabled at step 374 will again be disabled due to an engine stall. Controller 42 thus prevents engine 42 from being restarted in gear by moving key switch 70 to its "start" position following an engine stall, but requires the operator to re-command a neutral condition before the transmission can be engaged in gear.

It should be noted that the neutral start routine implemented by signal processing circuit 42 effectively serves as a microprocessor-based redundant system with analog neutral latch circuit 112. Thus, under normal conditions, neutral start circuit 110 and latch circuit 112 will disable coils 258 through 272 upon startup. However, neutral start routine provides an additional means of placing transmission 14 in a neutral condition in the event of failure or malfunction of control system 38 that could otherwise permit energization of the solenoid coils upon startup.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims. For example, while in the presently preferred embodiment described above, signal processing circuit 314 disables solenoid coil drivers 282 through 296, fewer drivers may be disabled in the neutral start routine, so long as the transmission is prevented from driving output shaft 58. In addition, while in the embodiment described above coils 258 through 276 are coupled to power through lines 252 and 254, and energized by grounding through driver circuits 282 through 300 (i.e. "low-side drivers"), those skilled in the art will appreciate that the coils may be coupled to ground and energized by drivers coupled to similar power lines (i.e. "high-side drivers"). Moreover, the conversion of the flow charts of FIGS. 7A and 7B into standard code to be stored in memory circuit 316 and implemented by signal processing circuit 314, or similar digital processing circuitry will be evident to those with ordinary skill in the art.

I claim:

1. A control system for a vehicle transmission of the type including an input shaft coupled to a vehicle engine, an output shaft for driving the vehicle, a plurality of intermeshing gears, and a plurality of fluid clutches associated with the gears, the clutches being selectively engageable in predetermined combinations via fluid valving to establish desired gear ratios between the input shaft and the output shaft, the control system comprising:

a sensor for generating an engine running signal representative of whether the vehicle engine is running;

an operator-movable command device for generating at least a neutral command signal;

a clutch engagement circuit including a plurality of solenoid coils associated with the clutches and selectively energizable to engage the clutches, and a driver circuit coupled to the solenoid coils for selectively energizing the coils; and a control circuit coupled to the sensor, the command device and the clutch engagement circuit, the control circuit prevents engagement in a gear ratio by disabling the solenoid coils upon startup of the vehicle engine until the engine running signal represents that the vehicle engine is running and the command device generates a neutral command signal.

2. The control system of claim 1, wherein the control circuit includes a digital processor coupled to the solenoid driver circuit which disables and enables the solenoid coils in response to a binary signal from the digital processor.

3. The control system of claim 1, wherein the sensor is a speed sensor for detecting rotation of the engine.

4. The control system of claim 1, wherein the operator-movable command device includes a shift lever having forward, reverse and neutral positions.

5. The control system of claim 1, wherein the operator-movable command device includes a clutch pedal.

6. The control system of claim 1, wherein the control circuit controls energization of the solenoid coils by selectively coupling the solenoid coils to ground via the driver circuit and wherein the control circuit disables the solenoid coils by preventing the driver circuit from coupling the coils to ground.

7. The control system of claim 1, wherein the control circuit again disables the solenoid coils when the engine running signal indicates an engine stall condition.

8. The control system of claim 1, further comprising a neutral start circuit coupled between a source of electrical power and the solenoid coils, the neutral start circuit being coupled to the neutral command device and to a start switch, the neutral start circuit interrupting power to the solenoid coils until the neutral command signal is generated after the start switch is moved to a start position.

9. A control system for a vehicle transmission, the vehicle including an engine, a starter coupled to the engine, and a transmission including an input shaft coupled to the engine, an output shaft for driving the vehicle, a plurality of intermeshing gears, and a plurality of fluid clutches associated with the gears, the clutches being selectively engageable in predetermined combinations via fluid valving to establish desired gear ratios between the input shaft and the output shaft, the control system comprising:

a clutch engagement circuit including a plurality of solenoid coils associated with the clutches and selectively energizable to engage the clutches, and a driver circuit coupled to the solenoid coils for selectively energizing the coils in response to control signals;

an analog electrical neutral start circuit for placing the transmission in a neutral condition upon startup of the engine; and a digital control circuit coupled to the clutch engagement circuit, the control circuit redundantly placing the transmission in a neutral condition upon startup of the engine and until the engine is in a running condition and a neutral condition is commanded by an operator.

10. The control system of claim 9, wherein the control circuit places the transmission in a neutral condition by disabling the engagement circuit to prevent energization of the solenoid coils.

11. The control system of claim 9, wherein the neutral start circuit is coupled between a source of electrical power and the solenoid coils and interrupts power to the solenoid coils until an operator-movable command device commands a neutral transmission condition upon startup of the vehicle engine.

12. The control system of claim 9, further comprising an engine running sensor for generating an engine running signal representative of whether the vehicle engine is running, and an operator-movable command device including a neutral command position for placing the transmission in a neutral condition, the control circuit being coupled to the sensor and to the command device and disabling the solenoid coils until the command device is placed in the neutral command position and the engine running signal is received.

13. The control system of claim 9, wherein the neutral start circuit is coupled between a source of electrical power and the solenoid coils and the driver circuit is coupled between the solenoid coils and ground, and wherein the control circuit disables the transmission preventing the drivers from coupling the solenoid coils to ground.

14. A method for controlling a transmission in a vehicle of the type including an engine, a transmission coupled between the engine and a drive train, and an operator-movable command device for placing the transmission in preselected forward, neutral and reverse drive conditions, the method comprising the steps of:

(a) sensing a parameter representative of whether the vehicle engine is running and generating an engine running signal representative thereof;

(b) sensing a position of the command device and generating a command signal representative thereof;

(c) disabling electronic driver circuits for shifting transmission control solenoid valves to place the transmission in a neutral condition; and (d) enabling the electronic driver circuits to permit the transmission to be shifted to forward and reverse gear ratios and thereby to transmit power from the engine to the drive train when the engine running signal and the command signal indicate a neutral condition is commanded and the vehicle engine is running.

15. The method of claim 14, wherein step (a) includes sensing rotation of an engine output shaft.

16. The method of claim 15, wherein the transmission is enabled at step (d) when the rotation of the engine output shaft is above a predetermined threshold speed.

17. The method of claim 14, wherein step (b) includes sensing a position of a transmission shift lever having forward, reverse and neutral positions.

18. The method of claim 14, wherein step (b) includes sensing a position of a clutch pedal.

19. The method of claim 14, comprising a further step of disabling the transmission when the engine running signal indicates a stall condition of the engine.

20. The method of claim 14, wherein a transmission control circuit includes an analog neutral start circuit that redundantly places the transmission in a neutral condition upon startup of the vehicle engine other than by disabling the driver circuits.

21. The method of claim 14, wherein the driver circuits are disabled and enabled via control signals from a digital signal processor.

* * * * *